March 12, 1935. W. M. HAWKINS 1,994,101
MEANS FOR PROTECTING TREES FROM INSECT PESTS
Filed Oct. 8, 1934
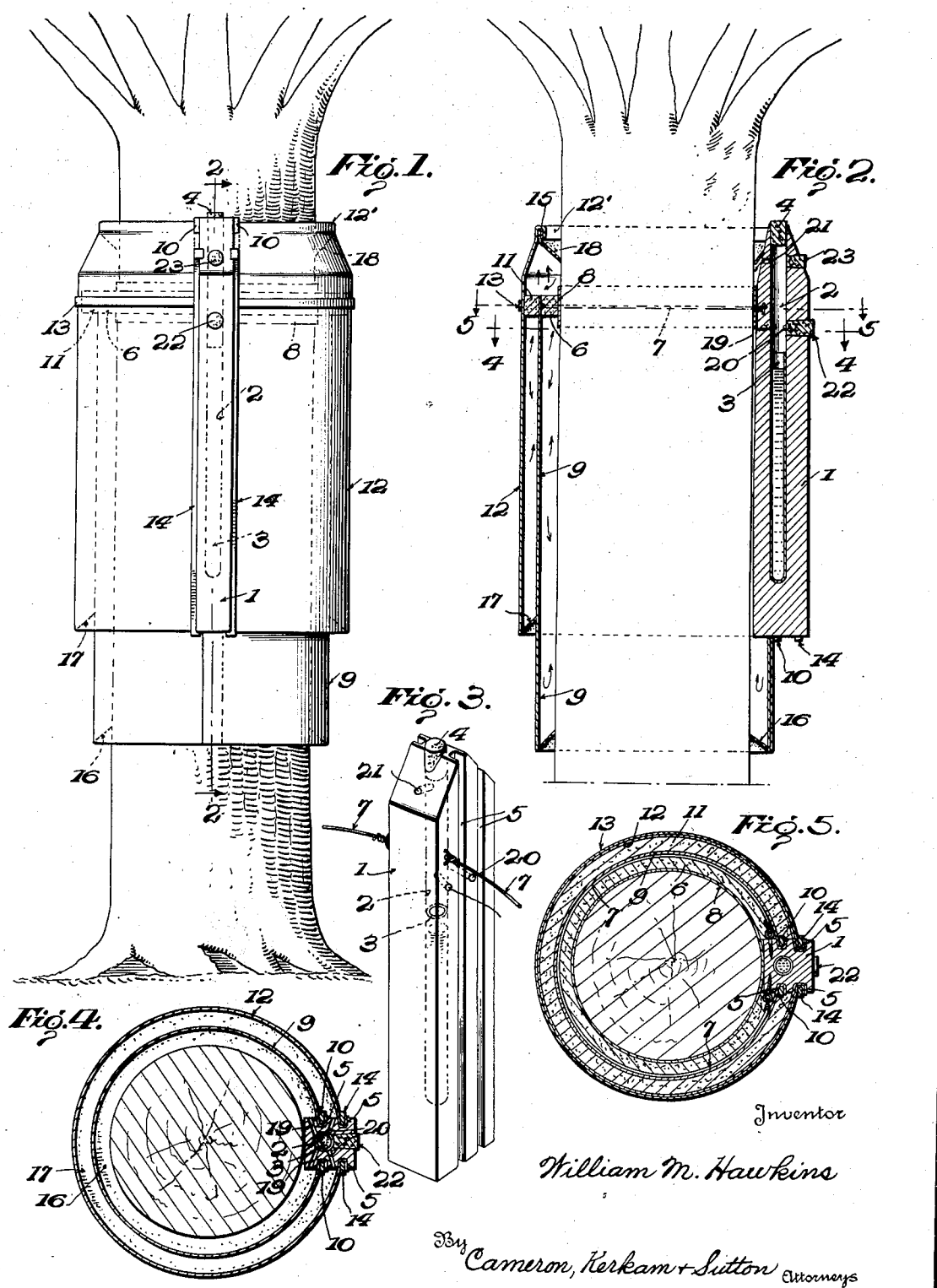
Inventor
William M. Hawkins
By Cameron, Kerkam + Sutton Attorneys Patented Mar. 12, 1935

1,994,101

UNITED STATES PATENT OFFICE 1,994,101

MEANS FOR PROTECTING TREES FROM INSECT PESTS

William M. Hawkins, Tacoma, Wash.

Application October 8, 1934, Serial No. 747,443

5 Claims. (Cl. 43—108)

This invention relates to means for protecting trees from crawling insects, worms, caterpillars, etc., and has for its object to destroy such pests as they attempt to crawl up the trunk of a tree. With this object in view the invention provides means whereby such pests as attempt to crawl up the tree enter a chamber or chambers which are filled with death-dealing gas, delivered to said chamber or chambers from a suitable gas reservoir.

The preferred embodiment of the invention is shown in the accompanying drawing, in which Fig. 1 is a side elevation;

Fig. 2 is a vertical section on the line 2—2 of Fig. 1;

Fig. 3 is a perspective view of one element containing the gas reservoir or chamber;

Fig. 4 is a transverse section on the line 4—4 of Fig. 2; and

Fig. 5 is a like section on the line 5—5 of Fig. 2.

Referring to said drawing, in which like reference numerals indicate like parts throughout the several views, 1 indicates a block of wood or other suitable material having centrally formed therein a gas chamber 2 which may be formed by simply boring a vertical channel in the block 1, from the top downward. Preferably, although not necessarily, there is a tube 3 of glass within the chamber 2, said tube being closed at its bottom and opened at its top, the tube being dropped into the chamber 2 at the top and the top of the chamber then closed by any suitable stopper, as a cork 4. The block 1 has formed on its opposite sides narrow, longitudinal slots or grooves 5—5, there being preferably two such slots on each of the opposite sides of the block, as will be readily understood from an inspection of Fig. 4.

A band of yielding material 6, preferably of felt or other fibrous material is passed around the tree and is clamped thereto by means of a wire 7 extending around the outside of the band 6 and attached at its opposite ends to the block 1, as clearly shown in Fig. 5. This wire may be drawn tightly around the band 6 of fibrous or other yielding material so as to cause it to snugly embrace the tree and at the same time hold the block 1 tightly against the tree. Preferably, although not necessarily, a band of pasteboard 8 (Fig. 2) is placed between the band 6 and the tree. The block 1 is thus held in vertical position against the tree with the slots or grooves 5—5 on opposite sides thereof. A curtain 9 of suitable material, preferably of dark colored cloth, is passed at its upper edge around the band 6 of fibrous material and its opposite edges are forced into and held in the grooves 5—5 by strips 10—10 which are tightly wedged into the grooves 5—5, as will be readily understood from an inspection of Figs. 4 and 5. The upper edge of the curtain 9 is held in intimate contact with the tree encircling band 6 by any suitable means, as here shown, such means taking the form of a second band 11 of yielding material, such as felt or the like, and a second curtain 12, preferably shorter than the curtain 9 in length, extends entirely around the band 11 and is held in suitable contact therewith by means of a band 13, preferably in the form of a strip of metal which tightly embraces the upper portion of the curtain 12, and has its free ends forced into the outer pair of grooves 5, together with the edges of the curtain 12 by suitable wedge-like strips 14, as illustrated in Fig. 5.

The upper edge of the curtain 12 extends somewhat above the yielding band 11 and the metal band 13, and is preferably somewhat inclined inward toward the tree and turned over a hoop or band of metal 15, supported in any suitable way by engagement with the top portion of the block 1, and the extreme upper edge of the curtain 12 is turned over said band or hoop, as shown at 12' (Fig. 1). Preferably, although not necessarily, the lower ends of the curtains 9 and 12 are provided with upwardly extending yielding brushes 16 and 17 to the end that the pest seeking to crawl up the tree can readily move said brushes upward and inward to enter the space between the tree and the curtain but cannot move the brushes outward to escape therefrom. Likewise, in case any pest seeks to crawl down the tree, the brushes 18 which extend inwardly and downwardly from the supporting hoop or band 12, permit the pest to enter the space immediately above the fibrous bands 6 and 11, but prevent its escape therefrom.

Now, referring to Fig. 4, ports 19—19 extend from the upper portion of the gas chamber 2 into the space between the tree and the curtain 9, and likewise ports 20—20 extend from said gas chamber 2 into the space between the curtains 9 and 12. There is also provided a port 21 (Fig. 3) leading from the upper portion of the gas chamber 2 into the chamber formed between the upper portion of the curtain 12 and the trunk of the tree. With the parts assembled, as shown in the drawing, the wire 7 closely clamps the block 1 and the fibrous band 6 to the tree with or without the interposition of the pasteboard band 8. The yielding character of this band 6 avoids any injury to the tree, since even though the parts may remain on the tree for a considerable length of time, the yielding thereof will permit the growth of the tree. Gaseous material or gas forming material, such as solid or liquid which will evaporate into a gas, may be introduced into the chamber 2 of the block 1, and when this is of liquid or solid form which might attack a wood container it is received within the glass tube 3 and the wood is protected. If preferred, the gas as such may be directly introduced into the chamber 2 of the block 1, either through the opening closed by the cork 4 or through a lateral port closed by any suitable stopper 22 (Fig. 2); and if desired a port closed by stopper 23 (Fig. 2) can be placed immediately opposite the port 21 to the end that the gaseous material may be injected directly through said port 21, or, in case of stoppage, the same may be readily cleaned.

Any suitable gas capable of producing death to the pest, such for example as hydrochloric acid gas, may be employed, or any gas generating solution may be placed within the chamber 2, and the gas passing from said chamber through the ports 19, 20 and 21 will enter the several spaces between the curtains or between the curtains and the tree and kill any of the pests therein.

Having thus described the invention, what is claimed is:

1. In combination, a long narrow body extending vertically against the trunk of a tree, said body having formed therein a chamber for gaseous material, a band of yielding material encircling the tree, means securing said band and body closely against the tree trunk, a curtain surrounding the tree but spaced therefrom, means securing the top of said curtain to said tree-encircling band, and means securing the vertical edges of said curtain to said vertical body, and a port extending from the chamber in said body to the space between said curtain and the tree.

2. In combination, a long narrow body extending vertically against the trunk of a tree, said body having formed therein a chamber for gaseous material, and vertical grooves on the opposite sides thereof, a band of fibrous material encircling the tree, means securing said band and body to the tree, a curtain surrounding the tree but spaced therefrom, means securing the top of said curtain to said fibrous band, and strips of material wedging in the vertical grooves in said body and securing the vertical edges of said curtain therein, and a port extending from the chamber in said body to the space between said curtain and the tree.

3. In combination, a gas chamber, a plurality of spaced curtains one within the other and each surrounding the tree and spaced therefrom, means closing the tops of the space between the said curtains and the space between the inner curtain and the tree, means securing said chamber and curtains to the tree, and ports extending from said chamber to the space between said curtains and the space between the innermost curtain and the tree.

4. In combination, a gas chamber, a plurality of spaced curtains one within the other and each surrounding the tree and spaced therefrom, means closing the tops of the space between said curtains and the space between the curtain and the tree, inwardly yielding brushes at the bottom of the curtains, and ports leading from said chamber to the space between said curtains and the space between the inner curtain and the tree.

5. In combination, a gas chamber, a plurality of spaced curtains one within the other and each surrounding the tree and spaced therefrom, means closing the tops of the space between said curtains and the space between the inner curtain and the tree, the upper edge of the outside curtain extending above said top-closing means, inwardly yielding brushes at the bottom of the curtains, an inwardly yielding brush extending from the upper edge of the outside curtain to the tree trunk, ports leading from said gas chamber to the space between said curtains and the space between the inner curtain and the tree, and a port leading from said chamber to the space between the upper edge of the outside curtain and the tree.

WILLIAM M. HAWKINS.